United States Patent
Wostbrock et al.

(10) Patent No.: US 6,942,762 B2
(45) Date of Patent: *Sep. 13, 2005

(54) METHOD FOR THE PRODUCTION OF A SALT-FREE AQUEOUS HYDROXYLAMINE SOLUTION

(75) Inventors: Karl-Heinz Wostbrock, Mörstadt (DE); Joachim Thiel, Neustadt (DE); Heinz Krüger, Limburgerhof (DE); Eckhard Ströfer, Mannheim (DE); Markus Weber, Ludwigshafen (DE); Bernd Gerber, Ludwigshafen (DE); Bernd Rumpf, Hockenheim (DE); Bernd Sachweh, Meckenheim (DE); Steffen Kerth, Ludwigshafen (DE)

(73) Assignee: BASF Akteingesellschaft, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/482,214

(22) PCT Filed: Jul. 2, 2002

(86) PCT No.: PCT/EP02/07285

§ 371 (c)(1),
(2), (4) Date: Dec. 30, 2003

(87) PCT Pub. No.: WO03/004409

PCT Pub. Date: Jan. 16, 2003

(65) Prior Publication Data

US 2004/0156774 A1 Aug. 12, 2004

(30) Foreign Application Priority Data

Jul. 4, 2001 (DE) .......................................... 101 31 787

(51) Int. Cl.[7] .......................... B01D 3/16; C01B 21/14; B01V 19/30
(52) U.S. Cl. ................... 203/14; 203/99; 203/DIG. 19; 202/158; 261/114.5; 261/DIG. 72; 422/211; 422/291; 423/351; 423/387
(58) Field of Search ............................... 203/2, 14, 99, 203/DIG. 19; 202/158; 261/114.5, DIG. 72, 112.2; 423/351, 387; 422/291, 211, 240

(56) References Cited

U.S. PATENT DOCUMENTS

| 3,721,850 | A | | 3/1973 | Giller | |
|---|---|---|---|---|---|
| 4,532,087 | A | * | 7/1985 | Boronyak et al. | 261/114.3 |
| 5,389,343 | A | * | 2/1995 | Gentry | 422/191 |
| 5,472,679 | A | | 12/1995 | Levinthal et al. | |
| 5,556,516 | A | * | 9/1996 | Koyama et al. | 203/91 |
| 5,837,107 | A | * | 11/1998 | Watzenberger et al. | 203/78 |
| 6,059,934 | A | * | 5/2000 | Stober et al. | 203/40 |
| 6,153,799 | A | | 11/2000 | Watzenberger et al. | |
| 6,235,162 | B1 | | 5/2001 | Sharifian et al. | |
| 6,254,735 | B1 | | 7/2001 | Watzenberger | |
| 6,286,818 | B1 | * | 9/2001 | Buhlmann | 261/97 |
| 6,299,734 | B1 | | 10/2001 | Watzenberger et al. | |
| 6,427,985 | B1 | * | 8/2002 | Kaibel et al. | 261/112.2 |

FOREIGN PATENT DOCUMENTS

| DE | 1 954 775 | 5/1960 |
|---|---|---|
| DE | 197 25851 | 12/1998 |
| EP | 188 387 | 7/1986 |
| WO | 97/22551 | 6/1997 |
| WO | 98/57886 | 12/1998 |
| WO | 99/97637 | 2/1999 |

OTHER PUBLICATIONS

D. W. Green, 1997, 14–23–14–61, Perry's Chemical Engineer's Handbook, (XP002217527).

K. Sattler thermische Trennverfahren: Grundlagen, Auslegung, Apparate (3rd Ed) 201, 242–249 (XP002217526).

Stoffinformationen, 1984, p. 3, 2, Eco–med–Verlag.

* cited by examiner

Primary Examiner—Virginia Manoharan
(74) Attorney, Agent, or Firm—Novak Drucen Quigg

(57) ABSTRACT

A process for preparing a salt-free aqueous hydroxylamine solution by distilling an aqueous solution of a hydroxylammonium salt and a base in a tray column having at least two mechanical trays, wherein random or structured packings are located above at least one tray of the tray column over the cross section of the column.

15 Claims, No Drawings

METHOD FOR THE PRODUCTION OF A SALT-FREE AQUEOUS HYDROXYLAMINE SOLUTION

The present invention relates to a process for preparing a salt-free aqueous hydroxylamine solution by distilling an aqueous solution of a hydroxylammonium salt and a base in a tray column having at least two mechanical trays, wherein random packings are located above at least one tray of the tray column over the cross section of the column.

High-purity concentrated aqueous hydroxylamine solutions are used inter alia in the electronics industry, in conjunction for example with other substances for cleaning printed circuit boards or silicon wafers. For use in the electronics industry, concentrations of impurities—metal ions in particular—of well below 1, ppm are normally required, i.e., electronic grade product. The purity requirements imposed on the aqueous hydroxylamine solutions are increasing continually.

Industrially, hydroxylamine is produced as a hydroxylammonium salt, normally as hydroxylammonium sulfate. To prepare salt-free aqueous hydroxylamine solutions, a base is added to an aqueous solution of a hydroxylammonium salt and an aqueous hydroxylamine solution is separated from the mixture, normally by distillation, in accordance for example with U.S. Pat. No. 5,472,679, WO 97/22551, WO98/57886, DE 1954775.8, WO 99/07637.

The distillation of aqueous solutions containing hydroxylamine, even on a laboratory scale, is regarded as a particularly hazardous operation: see Roth-Weller: Gefährliche Chemische Reaktionen, Stoffinformationen Hydroxylamin, page 3, 1984, 2, Eco-med-Verlag.

Accordingly, the aforementioned distillation necessitates a high level of technical complexity and a large amount of time.

Moreover, despite the distillation, aqueous hydroxylamine solutions contain impurities from their preparation, such as sodium sulfate or other metal compounds, in undesirably large amounts.

It is an object of the present invention to provide a process for preparing salt-free aqueous hydroxylamine solutions by distillation wherein the aqueous hydroxylamine solutions are obtained with a low level of impurities without any increase in technical complexity, time or safety risk.

We have found that this object is achieved by the process defined at the outset.

The process of the invention uses an aqueous solution of a hydroxylammonium salt and of a base. The solution may contain further substances without deleterious effect on the process of the invention, such as hydroxylamine, or stabilizer, such as 1,2-trans-(N,N,N',N'-tetraacetic acid)-cyclohexanediamine or its salts, sodium or ammonium salts for example, or the stabilizers described in WO 97/22551.

Suitable hydroxylammonium salts include salts of organic acids, such as formic acid, acetic acid, preferably salts of inorganic acids, such as sulfuric acid, phosphoric acid, hydrochloric acid, or mixtures of such salts.

These hydroxylammonium salts and their preparation are known per se.

To prepare the solution of a hydroxylammonium salt and of a base, the hydroxylammonium salts may be used advantageously in the form of aqueous solutions having a hydroxylammonium salt content of from 1 to 50, in particular from 25to 38% by weight.

Suitable bases are oxides or hydroxides of the alkali metals, such as lithium hydroxide, sodium hydroxide, potassium hydroxide, of the alkaline earth metals, such as calcium hydroxide, strontium hydroxide, barium hydroxide, ammonia, amines, such as monoamines, diamines or triamines, examples being methylamine, dimethylamine, trimethylamine, ethylamine, diethylamine, triethylamine, mono-, di- or trialkanolamines, such as diethanolamine, and cyclic amines, such as pyrrolidine or piperidine, and also mixtures of such bases.

The base may be used advantageously in the form of an aqueous solution, preferably at a concentration of from 1 to 30, in particular from 8 to 14 mol base functionality per liter.

The amount of base should be chosen so that the hydroxylammonium salt is converted completely or at least predominantly into free hydroxylamine. This can be done continuously or batchwise and at temperatures in the range from about 10° C. to 120° C.

The aqueous solution of a hydroxylammonium salt and of a base that is used in the process of the invention should have a hydroxylamine content of from 2 to 25, preferably from 8 to 12% by weight.

According to the invention, the salt-free aqueous hydroxylamine solution is prepared by distillation in a tray column having at least 10, actual trays.

Advantageously, the column should have an actual tray number in the range from 10 to 60. Suitable trays include crossflow trays such as sieve trays, valve trays, bubble cap trays and tunnel trays, or dual-flow trays, preferably sieve trays. The distance between trays should be in the range from 200 to 900 mm, preferably from 300 to 600 mm.

The column and trays may be manufactured from non-metallic materials, such as glass, ceramic, plastics. This prevents the decomposition initiated by metal ions. Surprisingly, however, it has been found that the column may also be manufactured from specific metallic materials, such as platinum or silver or zirconium, without any significant increase in the level of hydroxylamine decomposition observed.

The return ratio in the rectifying section may advantageously be regulated in such a way that it lies within the range from 0.2 to 2.

In accordance with the invention, located above at least one tray of the tray column, over the cross section of the column, are conventional random packings such as Raschig rings, Pall rings, saddles, modern high-performance random packings such as the Hiflow ring (from Rauschert (Steinwiesen, Germany)), Super-Raschig rings (from Raschig (Ludwigshafen, Germany)), Cascade-Mini rings (from Koch-Glitsch (Wichita, USA)), IMTP rings (from Norton (Akron, USA)) or Nutter rings (from Sulzer Chemtech (Wintherthur, Switzerland)) or structured packings such as Mellapak, Mellapak Plus or woven packings, preferably modern high-performance packings.

The packings should be inert toward the solution to be distilled, consisting for example of plastics or special metallic materials, preferably of perfluorinated polymers (e.g., TFM, PFA, Teflon).

The fill level of the packings between the trays should be from 50 to 300 mm preferably from 100 mm to 200 mm. The distance between the bed of packings and the tray above which the bed of packings is installed is between 0and 600 mm, preferably from 100 mm to 300 mm. The distance between the bed of packings and the tray below which the bed of packings is installed is from 0 to 300 mm preferably from 30 to 100 mm.

The pressure in the tray column is generally from 5 to 200 kPa (0.05 to 2 bar) preferably from 10 to 110 kPa (0.1 to 1.1 bar). It is particularly preferred to operate the tray column at a pressure in the range from 50 to 110 kPa (0.5 to 1.1 bar) and in particular under atmospheric pressure. This pressure relates to the pressure at the top of the tray column.

The temperatures prevailing in the tray column depend on the pressure at which the tray column is operated. They are generally in the range from 30 to 130° C. preferably from 80 to 130° C.

The energy required for distillation may advantageously be supplied by introducing steam in the bottom region. The temperature of this introduced steam should generally be in the range from 80 to 180° C. preferably in the range from 80 to 140° C.

The aqueous solution of a hydroxylammonium salt and of a base that is used in the process of the invention may be supplied at the top of the tray column, at one of the upper trays or, advantageously, at one of the middle trays. If desired, a device for separating entrained droplets, such as a demister, may be installed above the feed tray.

The bottom product obtained in the process of the invention is an aqueous solution comprising a salt of the anion of the hydroxylammonium salt and the cation of the base.

In one preferred embodiment, the tray column used may be a side offtake column.

In this case the salt-free aqueous hydroxylamine solution is withdrawn at the side offtake. Water is then generally obtained at the top of the column.

The salt-free aqueous hydroxylamine solution obtained in accordance with the invention generally has a hydroxylamine content of from 100 to 200 m/m %, preferably from 80 to 120 g/liter.

The salt-free aqueous hydroxylamine solution obtained by the process of the invention has a greater purity than a solution obtained by known distillation methods. Moreover the residence time of the distillation mixture in the column is shorter, and hence the thermal load is lower, than with known methods. Additionally, for a given column size and the same column holdup, the capacity of the column is increased. If the column includes a demister, the demister is unburdened relative to a known method.

The hydroxylamine solution obtained may, if desired, be concentrated in a distillation column. It may be advantageous to add a stabilizer prior to the distillation. The hydroxylamine solution may be fed in advantageously at a height of approximately one third of the theoretical tray number of the distillation column. At the column top, substantially hydroxylamine-free water is obtained and at the bottom a hydroxylamine solution whose concentration is dependent on the distillation conditions.

In general, the distillation column is operated with a pressure in the range from 1 to 200 kPa (from 0.01 to 2 bar), preferably from 5 to 120 kPa (from 0.05 to 1.2 bar), with particular preference from 30 to 110 kPa (from 0.3 to 1.1 bar), the pressure referring in each case to the pressure at the top of the column. The greater the extent to which the hydroxylamine is to be concentrated, the more gentle (low pressure and low temperature) the distillation must be. The distillation may take place continuously or batchwise.

The temperatures prevailing in the distillation column are dependent on the pressure at which the distillation column is operated. They are generally in the range from 10 to 160° C., preferably from 60 to 120° C.

The water or vapors taken off at the top of the distillation column may be recycled to the bottom of the column used in the process of the invention, directly or following compression or superheating as stripping steam, or may be supplied as waste water to a waste water treatment facility.

If desired, a device for deposition of entrained droplets, such as a demister, may be installed above the feed tray.

As the distillation column it is possible to use conventional columns in a conventional manner. As the distillation column it is advantageous to use a tray column having at least two trays.

The column should advantageously have an actual tray number in the range from 4 to 60. Suitable trays include crossflow trays such as sieve trays, valve trays, bubble cap trays and tunnel trays or dual-flow trays preferably sieve trays. The distance between these trays should be in the range from 200 to 900 mm preferably from 300 to 600 mm.

The column and trays may be manufactured from nonmetallic materials, such as glass, ceramic, plastics. This prevents the decomposition initiated by metal ions. Surprisingly, however it has been found that the column may also be manufactured from specific metallic materials, such as platinum, silver or zirconium, without a significant increase in hydroxylamine decomposition being observed.

Advantageously, a falling film evaporator is used to heat the column bottoms, although it is of course also possible to use other customary bottoms heaters, such as natural-circulation or forced-circulation evaporators, plate-type heat exchangers, etc.

The return ratio in the rectifying section may advantageously be regulated in such a way that it lies within the range from 0.2 to 2.

In accordance with the invention, located above at least one tray of the tray column over the cross section of the column, are conventional random packings such as Raschig rings, Pall rings, saddles, modern high-performance random packings such as the Hiflow ring (from Rauschert (Steinwiesen Germany)), Super-Raschig rings (from Raschig (Ludwigshafen Germany)), Cascade-Mini rings (from Koch-Glitsch (Wichita USA)), IMTP rings (from Norton (Akron USA) or Nutter rings (from Sulzer Chemtech (Wintherthur, Switzerland)) or structured packings such as Mellapak, Mellapak Plus or woven packings preferably modern high-performance packings.

The packings should be inert toward the solution to be distilled consisting for example of plastics or special metallic materials, preferably of perfluorinated polymers (e.g., TFM, PFA, Teflon).

The fill level of the packings between the trays should be from 50 to 300 mm preferably from 100 mm to 200 mm. The distance between the bed of packings and the tray above which the bed of packings is installed is between 0 and 600 mm preferably from 100 mm to 300 mm. The distance between the bed of packings and the tray below which the bed of packings is installed is from 0 to 300 mm preferably from 30 to 100 mm.

The concentrated aqueous hydroxylamine solution, which preferably has a hydroxylamine content in the range from 20 to 60% by weight, is generally obtained as the bottom product.

EXAMPLES

Comparative Example 1

In a tray column having 60 trays, a diameter of 1.5 m and a Kimre demister (two-stage monofilament woven demister in which the first stage is operated in the flooded state) above the 30th tray (reckoned from the bottom), 2.5 t/h of a solution of 8% by weight hydroxylamine (free base), 17.5 ppm by weight sodium sulfate and 1% by weight sodium hydroxide in water was introduced onto the 30 th tray.

At the top an amount of 5.5 t/h of water, pure but for a 1000 ppm by weight hydroxylamine content, was taken off with a return amount of 2.2 t/h and an addition of 10 kg/h of stabilizer.

Via a side uptake at the 31st tray 2.2 t/h of a solution of 8.9% by weight hydroxylamine in water with a contamination level of 10 ppm by weight Na$^+$ (as the sulfate or hydroxide), was taken off.

At the bottom 7.6 t/h of steam (1.5 bar) were fed in and 2.5 t/h of a solution of the remaining sodium sulfate and remaining sodium hydroxide in water with a contamination level of 3000 ppm by weight of hydroxylamine, were taken off.

The pressure drop across the column was 230 mbar.

The droplet size above the demister was about 50 µm.

Example 1

The procedure of Comparative Example 1 was repeated except that on each of the trays there was a 150 mm high bed of Hiflow rings 38/1 (Rauschert, Steinwiesen, Germany).

The top product contained only 800 ppm by weight of hydroxylamine as impurity.

The product obtained at the side offtake contained only 2 ppm of Na$^+$ (as a sulfate or hydroxide) as impurity.

The bottom product contained only 1500 ppm by weight of hydroxylamine as impurity.

The pressure drop across the column was 240 mbar.

The droplet size above the demister was about 5 µm.

Example 2

The procedure of Example 1 was repeated except that an amount of 3.5 t/h was fed in.

At the top, an amount of 7.7 t/h of water, pure but for a 800 ppm by weight hydroxylamine content, was taken off with a return amount of 3.1 t/h and an addition of 14 kg/h of stabilizer.

Via a side uptake at the 31st tray, 3.1 t/h of a solution of 8.9% by weight hydroxylamine in water with a contamination level of 2 ppm by weight Na$^+$ (as the sulfate or hydroxide) was taken off.

At the bottom, 10.7 t/h of steam (1.5 bar) were fed in and 3.5 t/h of a solution of the remaining sodium sulfate and remaining sodium hydroxide in water, with a contamination level of 1500 ppm by weight of hydroxylamine were taken off.

The pressure drop across the column was 350 mbar.

The droplet size above the demister was about 5 µm.

Comparative Example 2

The procedure of Example 2 was repeated except that there was no bed of packings on the trays of the column.

Under the high load conditions of Example 2, no reasonable separation was achievable.

We claim:

1. A process for preparing a salt-free aqueous hydroxylamine solution by distilling an aqueous solution of a hydroxylammonium salt and a base in a tray column having at least one mechanical tray, wherein random or structured packings are located above at least one tray of the tray column over the cross section of the column, and wherein the packings are arranged at a distance of from 100 to 600 mm above the tray.

2. A process as claimed in claim 1, wherein the tray column has from 10 to 80 actual trays.

3. A process as claimed in claim 1, wherein packing elements used comprise conventional random packings, high-performance random packings or structured packings.

4. A process as claimed in claim 1, wherein the temperature in the tray column is in the range from 80° C. to 130° C.

5. A process as claimed in claim 1, wherein the bottom product is an aqueous solution comprising a salt of the anion of the hydroxylammonium salt and the cation of the base.

6. A process as claimed in claim 1, wherein the tray column is a side offtake column.

7. A process as claimed in claim 6, wherein the salt-free aqueous hydroxylamine solution is obtained at the side offtake.

8. A process as claimed in claim 6, wherein water is obtained as the column top product.

9. The process of claim 1, wherein the distance between the tray and the packings is from 100 to 300 mm.

10. The process as claimed in claim 1, wherein the packings are arranged in form of a bed of packings.

11. The process as claimed in claim 10, wherein the bed of packings has a fill level of from 50 to 300 mm.

12. The process as claimed in claim 10, wherein the bed of packings has a fill level of from 100 to 200 mm.

13. The process as claimed in claim 10, wherein the bed of packings is arranged between an upper tray and a lower tray.

14. The process of claim 13, wherein the packings are arranged at a distance of from 0 to 300 mm below the upper tray.

15. The process of claim 13, wherein the packings are arranged at a distance of from 30 to 100 mm below the upper tray.

* * * * *